(12) United States Patent
Narayanan et al.

(10) Patent No.: US 10,937,438 B2
(45) Date of Patent: Mar. 2, 2021

(54) NEURAL NETWORK GENERATIVE MODELING TO TRANSFORM SPEECH UTTERANCES AND AUGMENT TRAINING DATA

(71) Applicant: Ford Global Technologies, LLC, Dearborn, MI (US)

(72) Inventors: Praveen Narayanan, San Jose, CA (US); Lisa Scaria, Milpitas, CA (US); Francois Charette, Tracy, CA (US); Ashley Elizabeth Micks, Mountain View, CA (US); Ryan Burke, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 15/940,639

(22) Filed: Mar. 29, 2018

(65) Prior Publication Data
US 2019/0304480 A1    Oct. 3, 2019

(51) Int. Cl.
| | | |
|---|---|---|
| *G10L 21/02* | (2013.01) |
| *G10L 15/16* | (2006.01) |
| *G10L 25/03* | (2013.01) |
| *G10L 15/06* | (2013.01) |
| *G06F 3/16* | (2006.01) |
| *G06N 5/04* | (2006.01) |

(52) U.S. Cl.
CPC ............. *G10L 21/02* (2013.01); *G06F 3/16* (2013.01); *G06N 5/046* (2013.01); *G10L 15/063* (2013.01); *G10L 15/16* (2013.01); *G10L 25/03* (2013.01)

(58) Field of Classification Search
CPC ....... G10L 21/02; G10L 15/063; G10L 15/16; G10L 25/03; G06N 5/046; G06F 3/16
USPC ......................................................... 704/200
See application file for complete search history.

(56) References Cited

U.S. PATENT DOCUMENTS

| | | | | |
|---|---|---|---|---|
| 5,794,191 A | * | 8/1998 | Chen ..................... G10L 15/16 704/232 |
| 6,185,533 B1 | * | 2/2001 | Holm ..................... G10L 13/10 704/211 |
| 6,304,865 B1 | | 10/2001 | Christensen |

(Continued)

FOREIGN PATENT DOCUMENTS

KR    101764274 B1    7/2017

OTHER PUBLICATIONS

NIPS 2016 End-To-End Learning for Speech and Audio Processing Workshop.

*Primary Examiner* — Michael Colucci
(74) *Attorney, Agent, or Firm* — David R. Stevens; Stevens Law Group

(57) ABSTRACT

Systems, methods, and devices for speech transformation and generating synthetic speech using deep generative models are disclosed. A method of the disclosure includes receiving input audio data comprising a plurality of iterations of a speech utterance from a plurality of speakers. The method includes generating an input spectrogram based on the input audio data and transmitting the input spectrogram to a neural network configured to generate an output spectrogram. The method includes receiving the output spectrogram from the neural network and, based on the output spectrogram, generating synthetic audio data comprising the speech utterance.

20 Claims, 7 Drawing Sheets

(56) References Cited

U.S. PATENT DOCUMENTS

| | | | | |
|---|---|---|---|---|
| 6,366,885 | B1* | 4/2002 | Basu | G11B 27/031 |
| | | | | 704/235 |
| 8,527,276 | B1* | 9/2013 | Senior | G06N 3/084 |
| | | | | 704/259 |
| 9,466,292 | B1 | 10/2016 | Lei | |
| 10,068,557 | B1* | 9/2018 | Engel | G06N 3/04 |
| 2005/0212930 | A1* | 9/2005 | Sim | H04N 19/154 |
| | | | | 348/231.4 |
| 2006/0122834 | A1* | 6/2006 | Bennett | G10L 15/30 |
| | | | | 704/256 |
| 2011/0035215 | A1* | 2/2011 | Sompolinsky | G10L 15/02 |
| | | | | 704/231 |
| 2015/0039315 | A1* | 2/2015 | Gross | G10L 13/08 |
| | | | | 704/273 |
| 2015/0058019 | A1* | 2/2015 | Chen | G10L 13/02 |
| | | | | 704/260 |
| 2016/0171974 | A1* | 6/2016 | Hannun | G06N 3/0454 |
| | | | | 704/232 |
| 2017/0069327 | A1 | 3/2017 | Heigold | |
| 2017/0140260 | A1 | 5/2017 | Manning | |
| 2017/0243571 | A1* | 8/2017 | Cogliati | G10G 1/04 |
| 2018/0190268 | A1* | 7/2018 | Lee | G10L 15/02 |
| 2018/0211164 | A1* | 7/2018 | Bazrafkan | G06N 3/088 |
| 2018/0211653 | A1* | 7/2018 | Melendo Casado | |
| | | | | G10L 15/222 |
| 2018/0218256 | A1* | 8/2018 | Raviv | G06N 3/088 |
| 2018/0233127 | A1* | 8/2018 | Visser | G10L 15/26 |
| 2018/0366138 | A1* | 12/2018 | Ramprashad | G10L 21/0208 |
| 2019/0005024 | A1* | 1/2019 | Somech | H04L 51/36 |
| 2019/0139563 | A1* | 5/2019 | Chen | G10L 21/0216 |
| 2019/0244138 | A1* | 8/2019 | Bhowmick | H04L 9/008 |
| 2019/0251360 | A1* | 8/2019 | Cricri | G06K 9/00744 |

\* cited by examiner

200

Receiving Input Audio Data Comprising A Plurality Of Iterations Of A Speech Utterance From A Plurality Of Speakers.
202

↓

Generating An Input Spectrogram Based On The Input Audio Data.
204

↓

Transmitting The Input Spectrogram To A Neural Network Configured To Generate An Output Spectrogram.
206

↓

Receiving The Output Spectrogram From The Neural Network.
208

↓

Based On The Output Spectrogram, Generating Synthetic Audio Data Comprising The Speech Utterance.
210

FIG. 2

US 10,937,438 B2

NEURAL NETWORK GENERATIVE MODELING TO TRANSFORM SPEECH UTTERANCES AND AUGMENT TRAINING DATA

TECHNICAL FIELD

The disclosure relates generally to systems, methods, and devices for speech transformation. The disclosure particularly relates to systems, methods, and devices for generating synthetic speech based on a plurality of speakers.

BACKGROUND

Neural networks have emerged as a viable solution for performing end-to-end learning in a multitude of data intensive applications. Neural networks include a set of algorithms, modeled loosely after the human brain, that are designed to recognize patterns. The neural network interprets sensory data through machine perception and is configured to label or cluster raw data inputs. Neural networks are configured to recognize numerical patterns contained in vectors, into which all real-world data, be it images, sound, text, or time series must be translated. Neural networks may be configured to cluster and classify data and to group unlabeled data according to similarities among example inputs and to classify data when there is a labeled dataset for the neural network to be trained on.

Automatic Speech Recognition (ASR) and Natural Language Understanding (NLU) are technological areas that have made progress using deep neural network (DNN) systems. Such neural networks can be trained to recognize and detect voices, identify speakers, transcribe speech to text, and recognize sentiment in voices, among other things. Applicant recognizes that a limiting factor in harnessing such technology is the data available to investigators for training and interference. Applicant recognizes that neural networks are best trained with plentiful data that is feature rich and can accommodate real world scenarios. It should be appreciated that data availability, including rich and feature augmented data, is a prerequisite for training a DNN in any application. However, the availability of large quantities of rich, feature augmented datasets, particularly speech datasets, is highly limited, and limits the success in training a DNN for speech recognition. Further, speech datasets can be very costly and contain hours of speech having questionable quality.

Applicant herein presents systems, methods, and devices for augmenting and generating speech datasets that may be used in speech recognition applications. The systems, methods, and devices disclosed herein may be configured to produce synthetic speech utterances for use in training purposes in the technological field of neural networks.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 2 is a flowchart diagram of a method for transforming speech data, according to one implementation;

DETAILED DESCRIPTION

Figure 1:
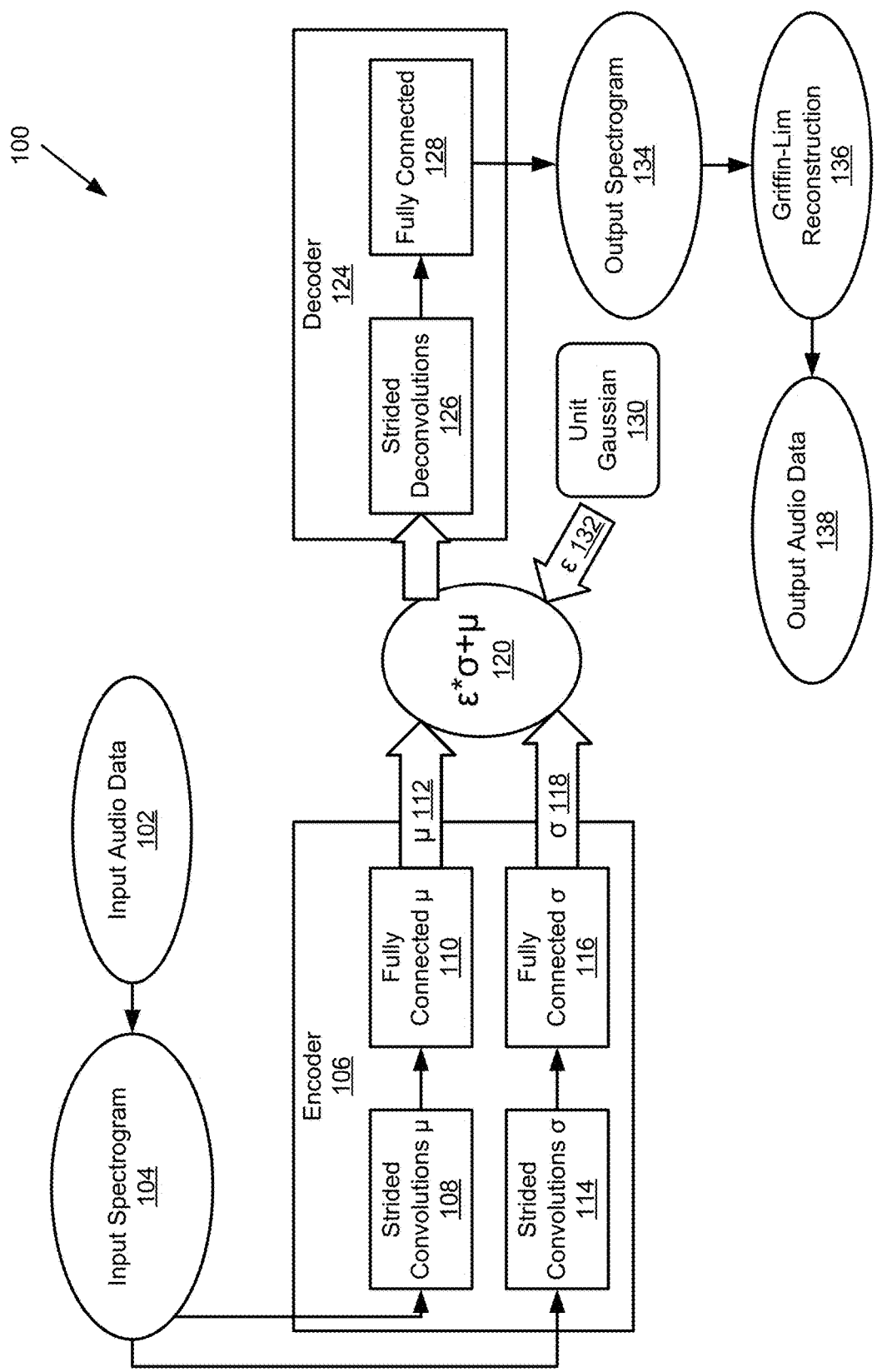
FIG. 1 is a schematic block diagram illustrating a process flow for transforming speech data, according to one implementation.

Neural networks, including deep neural network (DNN) systems, provide viable solutions for performing end-to-end learning in a multitude of data intensive applications. Such neural networks are trained using large quantities of rich feature augmented datasets. In an application where a neural network is trained for Automatic Speech Recognition (ASR) and/or Natural Language Understanding (NLU), the neural network is trained using large quantities of audio data, including speech data from a plurality of speakers.

In the present disclosure, Applicant proposes and presents systems, methods, and devices for speech transformation and particularly for speech generation using deep generative models. Such systems, methods, and devices may be integrated with a convolutional neural network (CNN) based on such CNN used for speech detection including Automatic Speech Recognition (ASR) and Natural Language Understanding (NLU).

Applicant proposes systems, methods, and devices for generating and providing large quantities of rich, feature augmented datasets for use with a neural network. Applicant proposes such systems, methods, and devices particularly directed to generating quality speech-based datasets including synthetic audio for a plurality of speech utterances. Such datasets can be used for training a neural network and developing next generation voice recognition interfaces with advanced functionality.

Before the methods, systems, and devices for detecting an object such as a manufacturing part are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

According to one embodiment of the disclosure, a method for generating synthetic speech is disclosed. In an embodiment, the method is performed by a computing device in communication with a neural network. The method includes receiving input audio data comprising a plurality of iterations of a speech utterance from a plurality of speakers. The method includes generating an input spectrogram based on the input audio data and transmitting the input spectrogram to a neural network configured to generate an output spectrogram. The method includes receiving the output spectrogram from the neural network and, based on the output spectrogram, generating synthetic audio data comprising the speech utterance.

According to one embodiment, a system for generating synthetic speech is disclosed. In an embodiment, the system includes a neural network configured to generate a two-dimensional audio spectrogram. The system further includes computer-readable storage media storing instructions that, when executed by one or more processors cause the one or more processors to receive input audio data comprising a plurality of iterations of a speech utterance from a plurality of speakers. The processors are further caused to generate an input spectrogram based on the input audio data and transmit the input spectrogram to the neural network. The processors are further caused to receive an output spectrogram from the neural network and, based on the output spectrogram, generate synthetic audio data comprising the speech utterance.

Referring now to the figures, FIG. 1 illustrates an example process 100 for transforming speech using deep generative models. The process 100 includes receiving input audio data 102 and generating an input spectrogram 104 based on the input audio data 102. The input spectrogram 104 is transmitted to a neural network where an encoder module 106 of the neural network receives the input spectrogram 104. The input spectrogram 104 may be received by one or more strided convolutions 108, 114 of the encoder module 106, including a strided convolutions μ (mu) 108 and a strided convolutions σ (sigma) 114. The strided convolutions 108, 114 transmit the input spectrogram 104 to one or more fully connected convolutions 110, 116 such as a fully connected convolution μ (mu) 110 and a fully connected convolution σ (sigma) 116. Fully connected convolution μ 110 provides the processed input spectrogram μ (mu) 112 and the fully connected convolution σ 116 provides the processed input spectrogram σ (sigma) 118. A unit gaussian 130 is sampled to receive a computation ε (epsilon). A calculation 120 is performed equal to:

$$\varepsilon * \sigma + \mu$$

The result of the calculation 120 is provided to the decoder module 124. The strided deconvolutions 126 of the decoder module 124 receive the result of the calculation 120 and provide the result to the fully connected convolutions 128. The decoder module 124 generates an output spectrogram 134 and provides the output spectrogram 134 to a computing device. The computing device receives the output spectrogram 134 and generates output audio data 138 using a Griffin Lim reconstruction 136.

The input audio data 102 includes any suitable input audio data 102 known in the art and may include raw audio data received from a speaker. In an embodiment, the input audio data 102 includes a plurality of iterations of a speech utterance, wherein the plurality of iterations are received from one or more speakers. The speech utterance includes any suitable speech utterance, including for example a word, a phrase, a sentence, a song, a noise, a sound, and so forth. In an embodiment, a single iteration of a speech utterance is received from a single speaker, and an additional single iteration of the speech utterance is received from a different speaker. In an embodiment, a single speaker provides a plurality of iterations of the speech utterance. In an embodiment, the input audio data 102 includes a plurality of iterations of the speech utterance from a single speaker and additionally includes iterations of the speech utterance from additional speakers. In an embodiment, various iterations of the speech utterance reflect different voices, different persons, different synthetic voices, different inflections, different accents, different languages, and so forth.

In an embodiment, the input spectrogram 104 includes a two-dimensional audio spectrogram. The spectrogram representation is used to represent the audio signals received in the input audio data 102. In an embodiment, one-dimensional input audio data 102 is converted to a two-dimensional spectrogram representation of the input audio data 102. The input spectrogram 104 is generated and fed into the neural network with the Mean Square Error (MSE) loss function as a training criterion, and the errors are backpropagated using gradient descent optimization.

In an embodiment, the output spectrogram 134 includes a two-dimensional audio spectrogram. The spectrogram representation may be used to represent the output audio data 138. In an embodiment, the output spectrogram 134 is inverted to generate output audio data 138 using Griffin Lim reconstruction 136. The Griffin Lim reconstruction 136 is utilized to recover phase information from the output spectrogram 134. It should be appreciated that neural network training can be done in any framework that uses gradient descent backpropagation. In an embodiment, a python-based graphical processing unit (GPU) framework is used.

The input spectrogram 104 and the output spectrogram 134 are representations of a speech signal and may be taken as a two-dimensional image comprising a width T (time) and a height F (frequency). Because speech signals show translational invariance online in the time domain, the frequency bins can be collapsed by initially taking convolutions of size l×F. Following this initial operation, the convolutions of size W×l may be applied, where W is the size of the convolution kernels. In various embodiments, max pooling and strided convolutions can be particularly successful. Deconvolutional layers can be similarly implemented.

The process of Griffin-Lim reconstruction 136 refers to the Griffin-Lim Algorithm. Further disclosure on the Griffin-Lim Algorithm can be found in Griffin, Daniel W., and Jae S. Lim. "Signal Estimation from Modified Short-Time Fourier Transform." *IEEE Transactions on Acoustics, Speech, and signal Processing*, Vol. ASSP-32, No. 2 (April 1984): 236-243, which is incorporated herein by reference. The algorithm is configured to estimate a signal form its modified short-time Fourier transform. The algorithm is obtained by minimizing the mean squared error between the short-time Fourier transform of the estimated signal and the modified short-time Fourier transform. The algorithm is shown to decrease, in each iteration, the mean squared error between the short-time Fourier transform magnitude of the estimated signal and the modified short-time Fourier transform magnitude. The major computation involved in the iterative algorithm is the discrete Fourier transform computation, and the algorithm is implementable in real-time. In an embodiment, the algorithm is applied to time-scale modification of speech to generate high-quality and feature rich synthetic speech.

The output audio data 138 includes any suitable audio data format known in the art. In an embodiment, the output audio data 138 includes synthetic audio data comprising a plurality of iterations of a speech utterance by a plurality of synthetic voices. The output audio data 138 may comprise a plurality of iterations of a particular speech utterance, such as a word, a phrase, a sentence, a sound, a recognizable noise, and so forth. In such an embodiment the plurality of iterations may be performed in a plurality of voices, frequencies, accents, speeds, and so forth. The output audio data 138 may include a feature rich and diverse collection of synthetic audio data for a plurality of speech utterances. In an embodiment the output audio data 138 is configured to be used for training purposes by a neural network.

The calculation 120 includes the determination provided by the encoder module 106 of the neural network. The calculation 120 includes wherein epsilon 132 is multiplied by sigma 118 and added to mu 112. Epsilon 132 represents the result from sampling a unit Gaussian 130 at N (0,1). Sigma 118 is received from its respective neural network in communication with the encoder module 106. Mu 112 is received from its respective neural network in communication with the encoder module 106.

In an embodiment, the encoder module 106 and decoder module 124 are components of a neural network. In an embodiment, the neural network is a convolutional neural network (CNN) as known in the art. The CNN comprises convolutional layers as the core building block of the neural network. A convolutional layer's parameters include a set of learnable filters or kernels, which have a small receptive field, but extend through the full depth of the input volume. During the forward pass, each filter is convolved across the width and height of the input volume, computing the dot product between the entries of the filter and the input and producing a two-dimensional activation map of the filter. As a result, the neural network 106 learns filters that activate when it detects a specific type of feature, such as a specific feature on a manufacturing part, at some spatial position in the input. In the neural network 106, stacking the activation maps for all filters along the depth dimension forms the full output volume of the convolution layer. Every entry in the output volume can thus also be interpreted as an output of a neuron that looks at a small region in the input and shares parameters with neurons in the same activation map. The neural network as a CNN can successfully accomplish image recognition, including identifying a manufacturing part from an image captured by an augmented reality device 102, at a very low error rate.

It is understood by one of skill in the art that a single neural network is composed of a plurality of nodes and edges connecting the nodes. Weights or values for the edges or nodes is used to compute an output for an edge connecting to a subsequent node. A single neural network may thus be composed of a plurality of neural networks to perform one or more tasks. In an embodiment, the neural network includes some common layers as a base portion or common portion of the neural network. The common layers may be understood as forming a sub network of the neural network. The computations and processing done in the common layers are then used by first task layers, second task layers, third task layers, and so forth. Thus, the neural network includes a branching topology where the results of the common layers are then used independently by each of a plurality of subnetworks in branches of the neural network. Because the common layers were trained sequentially on a plurality of tasks to avoid forgetting previously trained tasks, the common layers may perform a task that serves each of the neural network branches well. Furthermore, the common layers result in reduced computing because the task of the common layers is performed once for all tasks represented by the branches, instead of once for each task. One example of the task to be performed by the common layers is feature extraction. However, any tasks that may have a shared initial processing task may share common layers.

FIG. 2 illustrates a schematic flow chart diagram of a method 200 for transforming speech. The method 200 begins and a computing device receives input audio data 102 comprising a plurality of iterations of a speech utterance from a plurality of speakers at 202. The method 200 continues and the computing device generates an input spectrogram 104 based on the input audio data 102 at 204 and transmits the input spectrogram 104 to a neural network, wherein the neural network is configured to generate an output spectrogram 134 at 206. The computing device receives the output spectrogram 134 from the neural network at 208. The computing device generates synthetic audio data comprising the speech utterance based on the output spectrogram 134 at 210.

Figure 3:
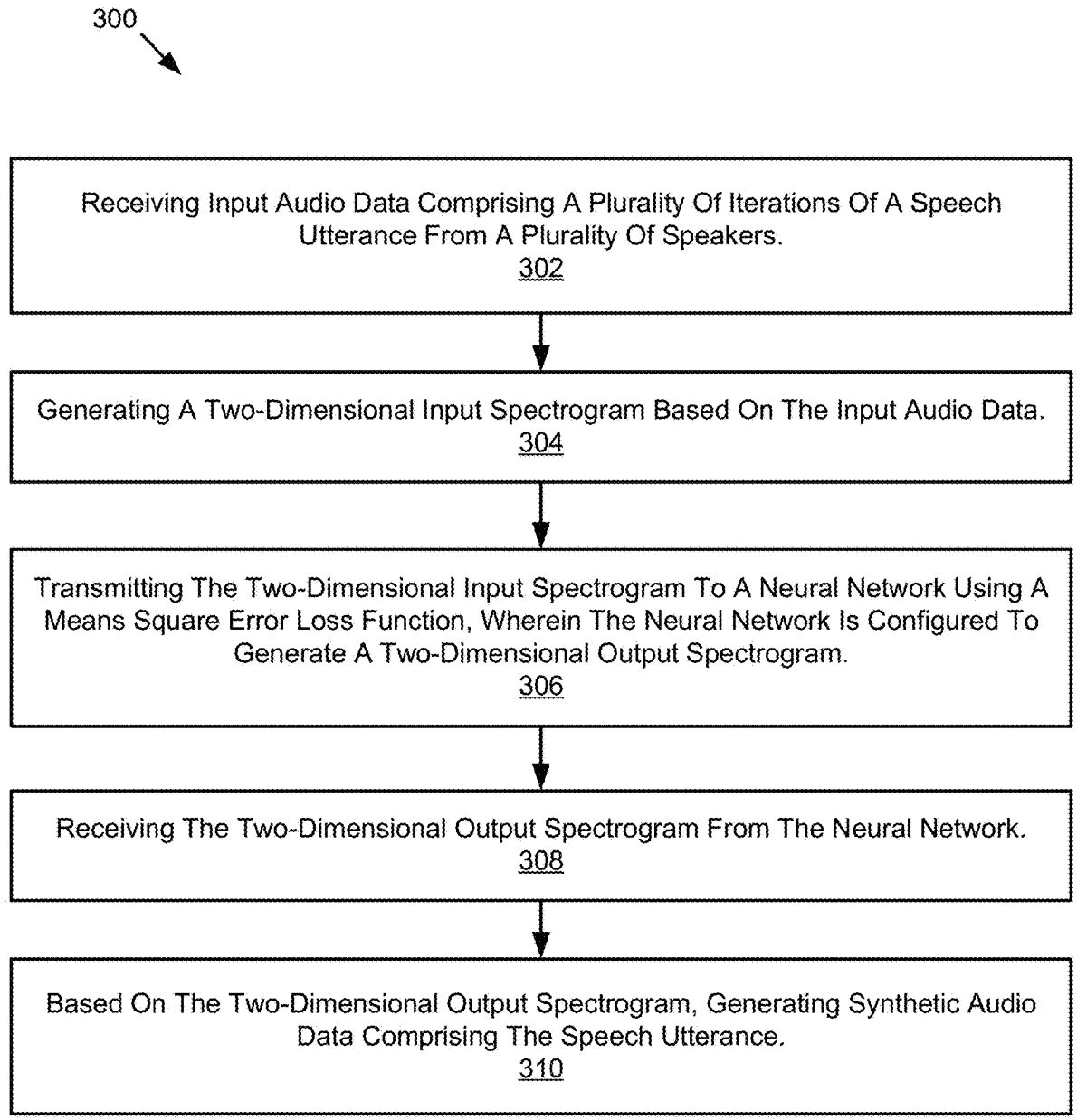
FIG. 3 is a flowchart diagram of a method for transforming speech data, according to one implementation.

FIG. 3 illustrates a schematic flow chart diagram of a method 300 for transforming speech. The method 300 begins and a computing device receives input audio data 102 comprising a plurality of iterations of a speech utterance from a plurality of speakers at 302. The computing device generates a two-dimensional input audio spectrogram based on the input audio data 102 at 304. The computing device transmits the two-dimensional input audio spectrogram to a neural network using a Means Square Error (MSE) loss function, wherein the neural network is configured to generate a two-dimensional output audio spectrogram at 306. The computing devices receives the two-dimensional output spectrogram 134 from the neural network at 308. The computing device generates synthetic audio data comprising the speech utterance based on the two-dimensional output spectrogram 134 at 310.

Figure 4:
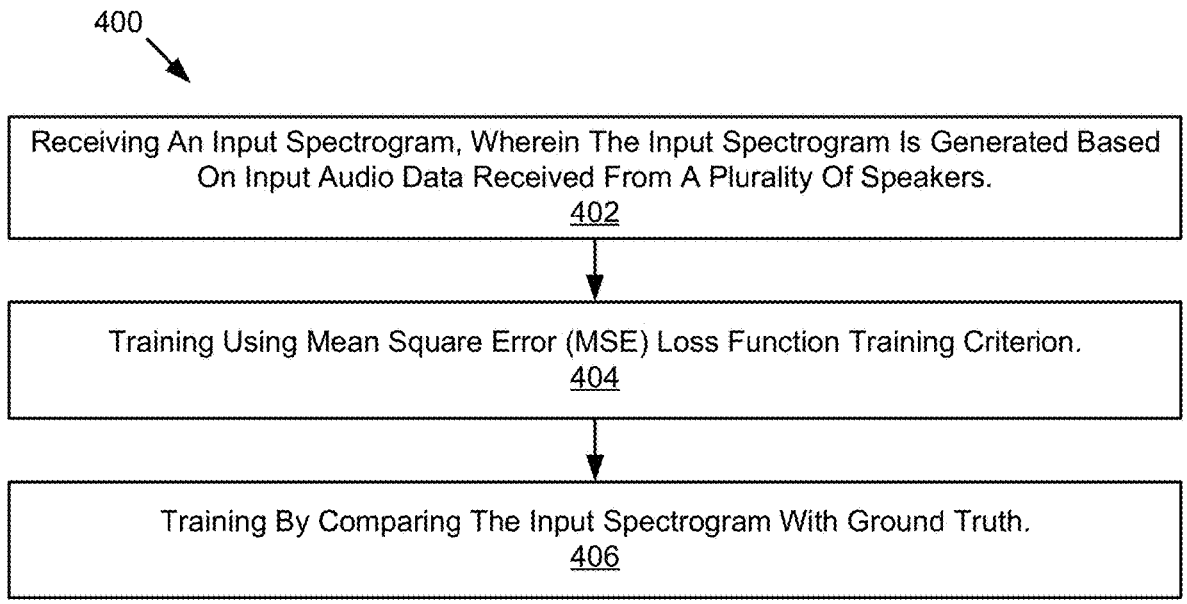
FIG. 4 is a flowchart diagram of a method for transforming speech data, according to one implementation.

FIG. 4 illustrates a schematic flow chart diagram of a method 400 for transforming speech. The method 400 begins and a neural network receives an input spectrogram 104, wherein the input spectrogram 104 is generated based on input audio data 102 received from a plurality of speakers at 402. The neural network is trained using Means Square Error (MSE) loss function training criterion at 404. The neural network is trained by comparing the input spectrogram 104 with ground truth at 406.

Figure 5:
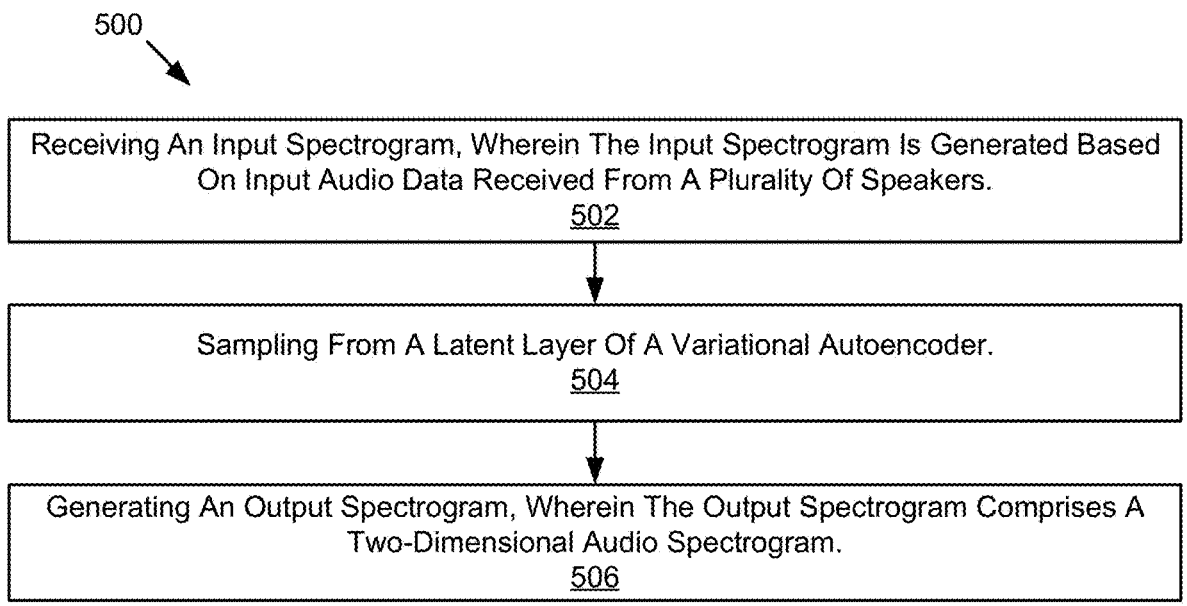
FIG. 5 is a flowchart diagram of a method for transforming speech data, according to one implementation.

FIG. 5 illustrates a schematic flow chart diagram of a method 500 for transforming speech. The method 500 begins and a neural network receives an input spectrogram 104, wherein the input spectrogram 104 is generated based on input audio data 102 received from a plurality of speakers at 502. The neural network samples from a latent layer of a variational autoencoder at 504. The neural network generates an output spectrogram 134, wherein the output spectrogram 134 comprises a two-dimensional audio spectrogram at 506.

Figure 6:
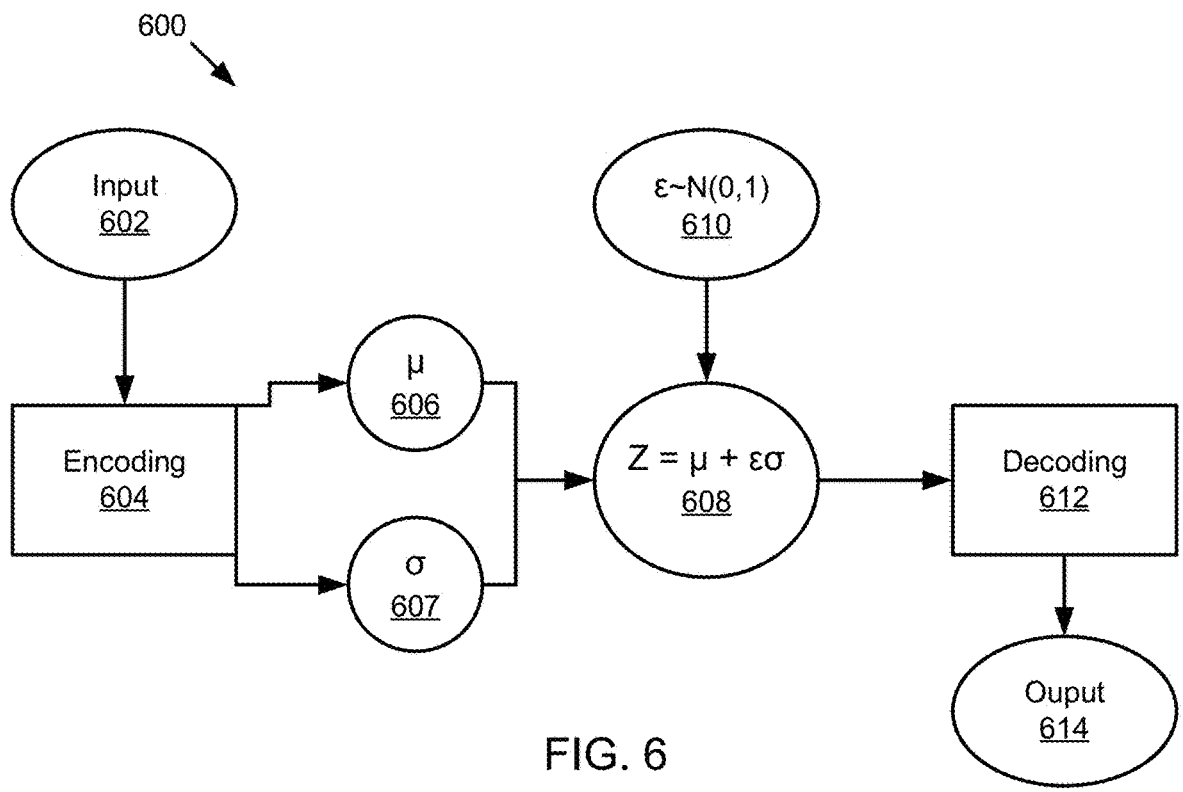
FIG. 6 is a schematic flowchart diagram illustrating an example training phase, according to one implementation.

FIG. 6 illustrates a schematic flowchart diagram of a process 600 for training a neural network. In an embodiment FIG. 6 represents a training phase procedure for transforming and/or generating speech data. The process 600 includes receiving an input 602 and processing the input 602 through an encoding module 604. The encoding module 604 produces μ (mu) 606 and σ (sigma) 607. ε (epsilon) 610 is generated by sampling a unit Gaussian at N (0,1). A computation 608 is performed equal to $Z = \mu + \varepsilon\sigma$ wherein Z is equal to a latent space vector. The result of the computation 608 is provided to a decoding module 612 and the decoding module 612 provides an output 614. During training, the neural network is trained end to end by comparing the output spectrograms and the reconstructions generated by the speech variational autoencoder's decoding module 612. FIG. 6 illustrates the pre and post processing stages of converting input audio data 102 to an input spectrogram 104 and back to output audio data 138 by way of the Griffin-Lim reconstruction 136. The input spectrogram 104 is converted to the latent representation Z by sending to the encoding module 604. The output spectrogram 134 is generated by the decoding module 612.

Figure 7:
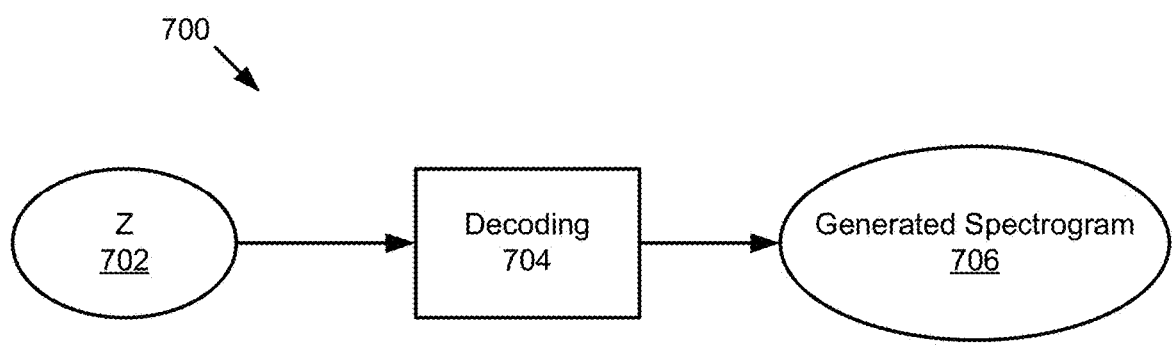
FIG. 7 is a schematic flowchart diagram illustrating an example testing and/or generating phase, according to one implementation.

FIG. 7 illustrates a schematic flowchart diagram of a process 700 for training and/or generating by a neural network. The process 700 includes determining a latent representation Z 702 and processing the latent representation Z 702 through a decoding 704 process. The latent representation Z 702 is determined by sampling from a latent space range (−a,a) to create the latent space vector Z having the same dimensions as used in training (see FIG. 6). The decoding 704 process receives the latent representation Z 702 as an input needed for determining the generated spectrogram 706. The process 700 includes providing a generated spectrogram 706 by way of the decoding 704 process. During test time, new audio samples are generated by sending the latent representation Z 702 (obtained by adding the encoder outputs µ (mu) and σ (sigma) multiplied by the sampling variable ε (epsilon) drawn from a unit Gaussian (see computation 608) to the decoding module 704. The decoding module 704 then provides a generated spectrogram 706 comprising a new audio spectrogram. The generated spectrogram 706 is provided to a Griffin-Lim reconstruction 136 module to be inverted back to an audio signal (output audio data 138). During the process 600 for training, the latent representation Z is obtained by subjecting the encoded quantities (µ, σ) to the computation 608 after sampling from a unit Gaussian 610. During the process 700 for testing and/or generating, the latent representation Z 702 is sampled from a range e.g. (−a,a) to generate new utterances.

Figure 8:
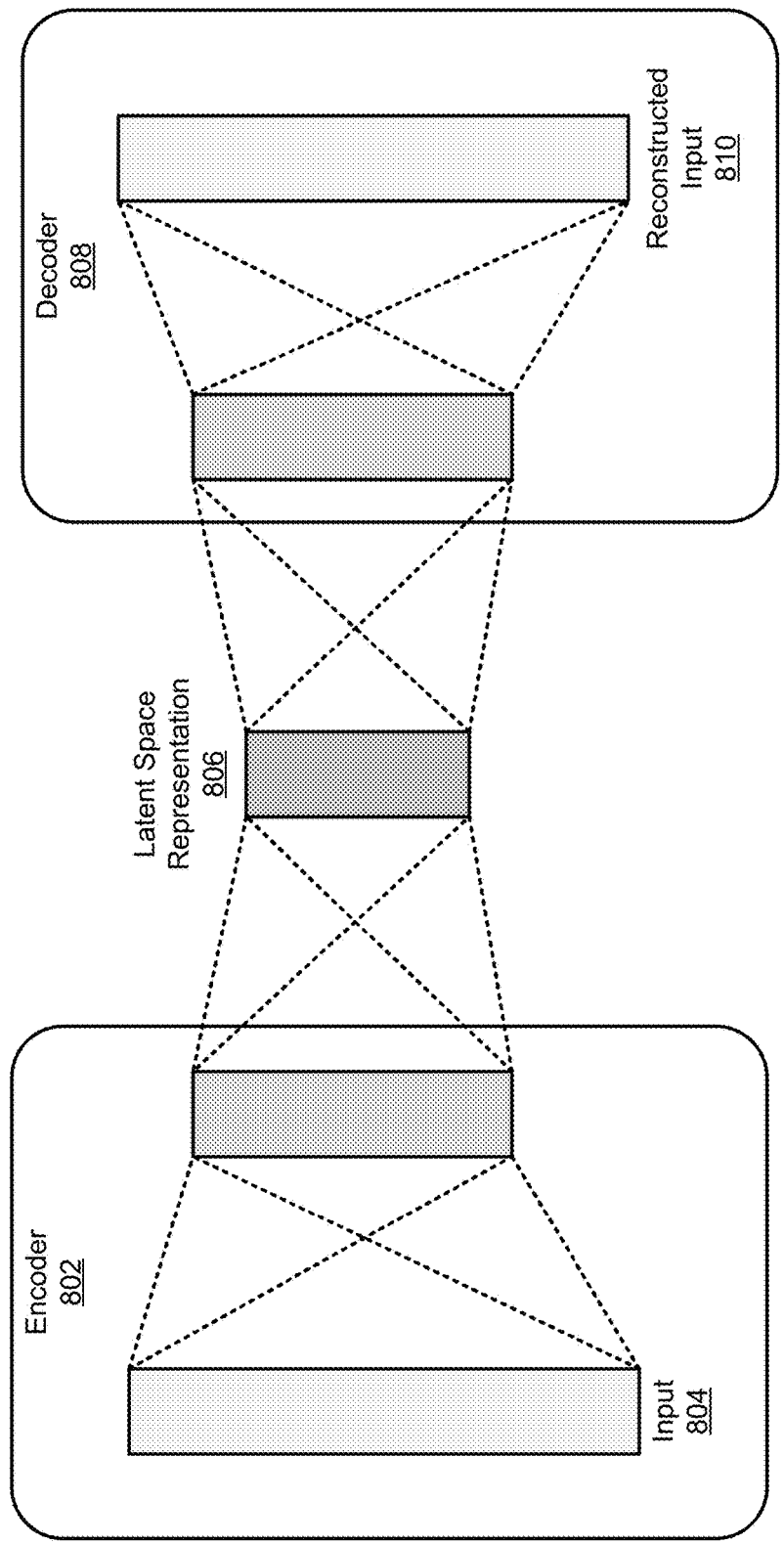
FIG. 8 is a schematic diagram of a fully connected convolution of a neural network, according to one implementation.

FIG. 8 illustrates a schematic block diagram of a fully connected architecture 800 for a variational autoencoder. In further embodiments a strided convolutions architecture is used. The fully connected architecture 800 (see also 110, 116, 128) includes an encoder 802 and a decoder 808. The encoder 802 receives an input 804 and brings the input 804 data from a high dimensional input to a bottleneck layer, where the number of neurons is the smallest. The decoder 808 takes the encoded input and converts it back to the original input shape as a reconstructed input 810. The latent space representation 806 comprises the space in which data lies in the bottleneck layer. In an embodiment, the latent space representation 806 includes a compressed representation of the data which is the only information the decoder uses to provide the reconstructed input 810. As such, the neural network extracts the most relevant features in the bottleneck.

Figure 9:
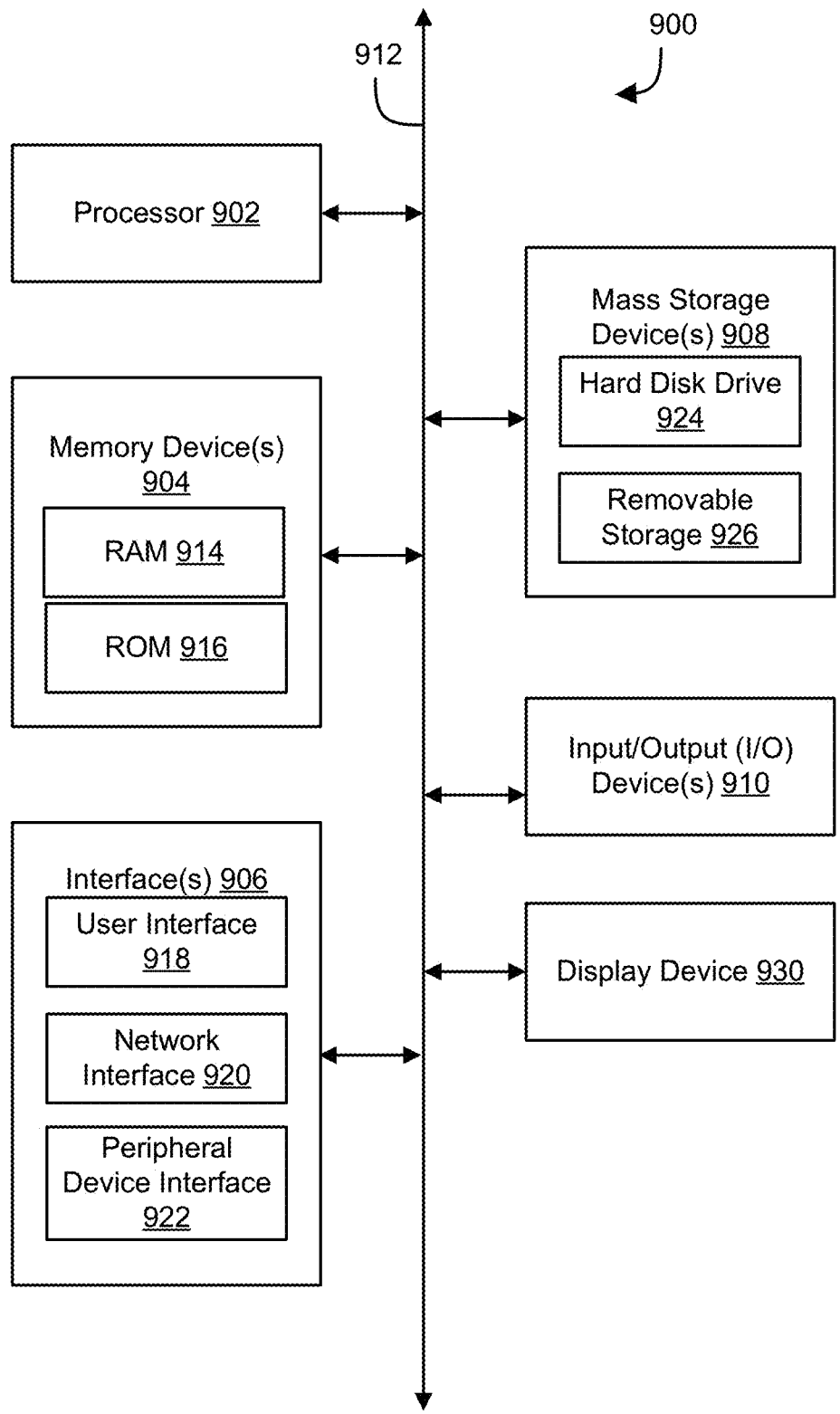
FIG. 9 is a schematic block diagram of an example computing device, according to one implementation.

Referring now to FIG. 9, a block diagram of an example computing device 900 is illustrated. Computing device 900 may be used to perform various procedures, such as those discussed herein. In one embodiment, the computing device 900 can function as a neural network, an encoder module 106, a decoder module 124, and the like. Computing device 900 can perform various monitoring functions as discussed herein, and can execute one or more application programs, such as the application programs or functionality described herein. Computing device 900 can be any of a wide variety of computing devices, such as a desktop computer, in-dash computer, vehicle control system, a notebook computer, a server computer, a handheld computer, tablet computer and the like.

Computing device 900 includes one or more processor(s) 902, one or more memory device(s) 804, one or more interface(s) 906, one or more mass storage device(s) 908, one or more Input/output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900 and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for generating synthetic speech data. The method includes: receiving input audio data comprising a plurality of iterations of a speech utterance from a plurality of speakers; generating an input spectrogram based on the input audio data; transmitting the input spectrogram to a neural network configured to generate an output spectrogram; receiving the output spectrogram from the neural network; and based on the output spectrogram, generating synthetic audio data comprising the speech utterance.

Example 2 is a method as in Example 1, wherein one or more of the input spectrogram and the output spectrogram comprises a two-dimensional audio spectrogram representation.

Example 3 is a method as in any of Example 1-2, wherein the speech utterance comprises one or more of a word, a phrase, a sentence, or a noise.

Example 4 is a method as in any of Example 1-3, wherein the plurality of speakers comprises real-life speakers and synthetic speakers.

Example 5 is a method as in any of Example 1-4, further comprising transmitting the synthetic audio data comprising the speech utterance to a training neural network configured to be trained using the synthetic audio data.

Example 6 is a method as in any of Example 1-5, wherein the neural network comprises a modified neural network architecture comprising convolutional layer in an encoder and deconvolutional layers in a decoder.

Example 7 is a method as in any of Example 1-6, wherein the neural network is configured to undergo a training phase and a generation phase, wherein the training phase comprises learning a plurality of parameters for producing the output spectrogram and the generation phase comprises generating the output spectrogram by sampling from a latent layer.

Example 8 is a method as in any of Example 1-7, wherein the input audio data comprises a one-dimensional input audio signal.

Example 9 is a method as in any of Example 1-8, wherein transmitting the input spectrogram to the neural network comprises feeding the input spectrogram using a Mean Square Error loss function as a training criterion.

Example 10 is a method as in any of Example 1-9, wherein the neural network is configured to generate the output spectrogram by way of Griffin Lim reconstruction.

Example 11 is a method as in any of Example 1-10, wherein one or more of the input spectrogram and the output spectrogram comprises a two-dimensional image comprising a time axis and a frequency axis.

Example 12 is a system for generating synthetic speech data. The system includes: a neural network configured to generate a two-dimensional audio spectrogram; and computer-readable storage media storing instructions that, when executed by one or more processors cause the one or more processors to: receive input audio data comprising a plurality of iterations of a speech utterance from a plurality of speakers; generate an input spectrogram based on the input audio data; transmit the input spectrogram to the neural network; receive an output spectrogram from the neural network; and based on the output spectrogram, generate synthetic audio data comprising the speech utterance.

Example 13 is a system as in Example 12, wherein the neural network comprises a modified neural network architecture based on a variational autoencoder model, and wherein the neural network comprises convolutional layers used in an encoder and deconvolutional layers used in a decoder.

Example 14 is a system as in any of Example 12-13, wherein the neural network comprises a workflow and the workflow comprises: a training phase wherein the neural network functions as an autoencoder and is configured to learn a plurality of parameters for generating the output spectrogram; and a generation phase wherein the neural network generates the output spectrogram.

Example 15 is a system as in any of Example 12-14, wherein the neural network undergoes the generation phase after the neural network has been trained and an encoding layer of the neural network has been removed.

Example 16 is a system as in any of Example 12-15, wherein the neural network is configured to generate the output spectrogram by sampling from a latent layer.

Example 17 is a system as in any of Example 12-16, wherein the computer-readable storage media generates synthetic audio data by way of Griffin Lim reconstruction to recover phase information.

Example 18 is a system as in any of Example 12-17, wherein the computer-readable storage media transmits the input spectrogram to the neural network with a Mean Square Error loss function as a training criterion, wherein errors are backpropagated using gradient descent optimization.

Example 19 is a system as in any of Example 12-18, wherein the neural network comprises a variational autoencoder architecture comprising strided convolutions, fully connected convolutions, and strided deconvolutions.

Example 20 is computer-readable storage media storing instructions that, when executed by one or more processors cause the one or more processors to: receive input audio data comprising a plurality of iterations of a speech utterance from a plurality of speakers; generate a two-dimensional input audio spectrogram based on the input audio data; transmit the two-dimensional input audio spectrogram to a neural network; receive a two-dimensional output audio spectrogram from the neural network; and based on the two-dimensional output audio spectrogram, generate synthetic audio data comprising the speech utterance.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible considering the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for generating synthetic speech data, the method comprising:
   receiving input audio data comprising a speech utterance;
   generating an input spectrogram based on the input audio data;

providing the input spectrogram to one or more strided convolutions of an encoder module of a neural network configured to process the input spectrogram to generate a resultant computation;

receiving an output spectrogram from a decoder module of the neural network configured to generate the output spectrogram based on the resultant computation; and based on the output spectrogram, generating synthetic audio data comprising the speech utterance.

2. The method of claim 1, wherein one or more of the input spectrogram and the output spectrogram comprises a two-dimensional audio spectrogram representation.

3. The method of claim 1, wherein the speech utterance comprises one or more of a word, a phrase, a sentence, or a noise.

4. The method of claim 1, wherein the input audio data comprises a plurality of iterations of the speech utterance from a plurality of speakers, and wherein the plurality of speakers comprises real-life speakers and synthetic speakers.

5. The method of claim 1, further comprising transmitting the synthetic audio data comprising the speech utterance to a training neural network configured to be trained using the synthetic audio data.

6. The method of claim 1, wherein the neural network comprises a modified neural network architecture comprising a convolutional layer in the encoder module and a deconvolutional layer in the decoder module.

7. The method of claim 6, wherein the neural network is configured to undergo a training phase and a generation phase, wherein the training phase comprises learning a plurality of parameters for producing the output spectrogram and the generation phase comprises generating the output spectrogram by sampling from a latent layer.

8. The method of claim 1, wherein the input audio data comprises a one-dimensional input audio signal.

9. The method of claim 1, wherein providing the input spectrogram to the neural network comprises feeding the input spectrogram using a Mean Square Error loss function as a training criterion.

10. The method of claim 1, wherein the decoder module of the neural network is configured to generate the output spectrogram by way of Griffin-Lim reconstruction.

11. The method of claim 1, wherein one or more of the input spectrogram and the output spectrogram comprises a two-dimensional image comprising a time axis and a frequency axis.

12. A system for generating synthetic speech data, the system comprising:
a neural network configured to generate a two-dimensional audio spectrogram; and
non-transitory computer-readable storage media storing instructions that, when executed by one or more processors cause the one or more processors to:
receive input audio data comprising a plurality of iterations of a speech utterance from a plurality of speakers;
generate an input spectrogram based on the input audio data;
provide the input spectrogram to one or more strided convolutions of an encoder module of the neural network configured to process the input spectrogram to generate a resultant computation;
receive an output spectrogram from a decoder module of the neural network configured to generate the output spectrogram based on the resultant computation; and
based on the output spectrogram, generate synthetic audio data comprising the speech utterance.

13. The system of claim 12, wherein the neural network comprises a modified neural network architecture based on a variational autoencoder model, and wherein the neural network comprises a convolutional layer used in the encoder module and a deconvolutional layer used in the decoder module.

14. The system of claim 12, wherein the neural network comprises a workflow and the workflow comprises:
a training phase wherein the neural network functions as an autoencoder and is configured to learn a plurality of parameters for generating the output spectrogram; and
a generation phase wherein the neural network generates the output spectrogram.

15. The system of claim 14, wherein the neural network undergoes the generation phase after the neural network has been trained and an encoding layer of the neural network has been removed.

16. The system of claim 12, wherein the decoder module of the neural network is configured to generate the output spectrogram by sampling from a latent layer.

17. The system of claim 12, wherein the non-transitory computer-readable storage media causes the one or more processors to generate the synthetic audio data by way of Griffin-Lim reconstruction to recover phase information.

18. The system of claim 12, wherein the non-transitory computer-readable storage media causes the one or more processors to provide the input spectrogram to the one or more strided convolutions of the encoder module of the neural network with a Mean Square Error loss function as a training criterion, wherein errors are backpropagated using gradient descent optimization.

19. The system of claim 12, wherein the neural network comprises a variational autoencoder architecture comprising a strided convolution, a fully connected convolution, and a strided deconvolution.

20. Non-transitory computer readable storage media storing instructions for execution by one or more processors, the instructions comprising:
receiving input audio data comprising a plurality of iterations of a speech utterance from a plurality of speakers;
generating a two-dimensional input audio spectrogram based on the input audio data;
providing the two-dimensional input audio spectrogram to one or more strided convolutions of an encoder module of a neural network configured to process the input spectrogram to generate a resultant computation;
receiving a two-dimensional output audio spectrogram from a decoder module of the neural network configured to generate the two-dimensional output audio spectrogram based on the resultant computation; and
based on the two-dimensional output audio spectrogram, generating synthetic audio data comprising the speech utterance.

* * * * *